July 11, 1950     C. R. MOLINE     2,514,504
PIPE CLAMP

Filed April 19, 1947     2 Sheets-Sheet 1

INVENTOR.
Carl R. Moline
BY
Zabel & Gritzbaugh
Attorneys

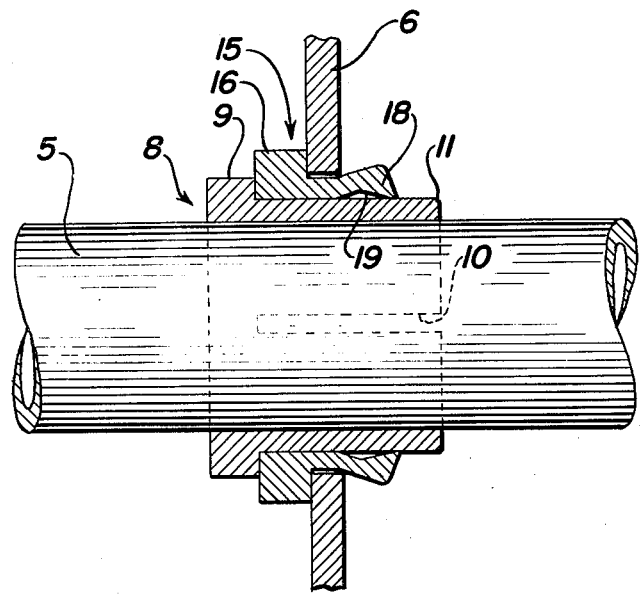
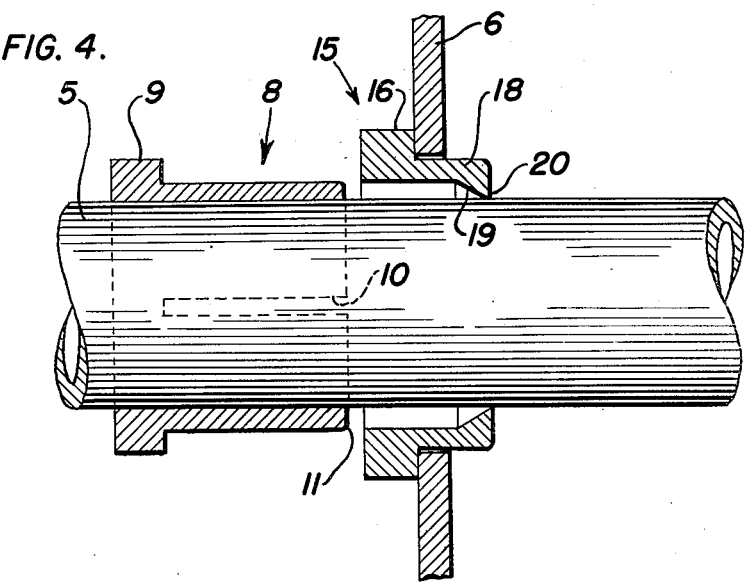

Patented July 11, 1950

2,514,504

UNITED STATES PATENT OFFICE 2,514,504

PIPE CLAMP

Carl R. Moline, Homewood, Ill., assignor to Pullman-Standard Car Manufacturing Company, Chicago, Ill., a corporation of Delaware Application April 19, 1947, Serial No. 742,513

4 Claims. (Cl. 248—56)

This invention relates to clamps, and more particularly to a clamp for effecting a substantially rigid connection between a pipe and a plate through which the pipe passes. The present clamp is particularly suited for use with the air conducting or other pipes that extends longitudinally of a railroad car, which pipes must be supported at intervals throughout the car length.

An object of the invention is to provide a simple, inexpensive and foolproof clamp that will effect the desired connection between a pipe and a supporting plate or bracket. The connection provided is one that securely holds the pipe in such a manner that train vibrations and sudden impact will not adversely affect the connection. The clamp establishes a sufficiently rigid connection between the pipe and the plate so that rattles will not develop, but yet the connection is sufficiently yieldable that conditions of impact or sudden stress will not caues clamp failure. Rather, slight pipe displacement with respect to the plate may occur.

Another object is to provide a clamp of this character that may be applied with a minimum of labor.

Still another object contemplates a clamp made up of two easily formed separate parts, and the sizes of these parts within reasonable limits are not particularly critical.

Other objects and advantages of the invention will be apparent as the description proceeds, reference being had to the accompanying drawing wherein one form of the invention is shown. It is to be understood that the description and drawing are illustrative only, and are not to be taken as limiting the invention except insofar as it is limited by the claims.

In the drawings:

Fig. 3 is a view partly in section on line 3—3 of Fig. 2; and

Fig. 4 is a view partly in section showing the clamp in partially disassembled condition.

Figure 1:
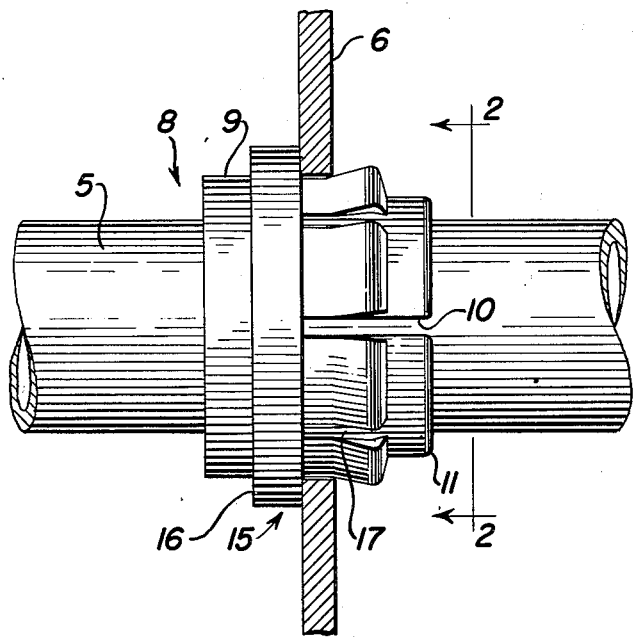
Fig. 1 is an elevational view showing my clamp in assembled relationship with a pipe and an associated plate or pipe support.
Figure 2:
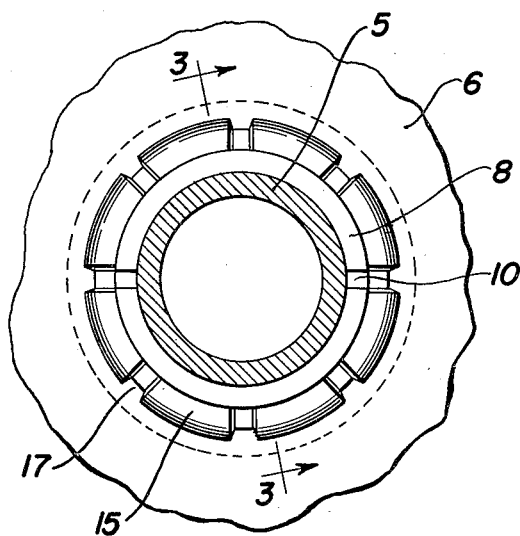
Fig. 2 is a sectional view on line 2—2 of Fig. 1.

Referring to the drawings, a metallic pipe 5 extends through a circular opening in a plate 6 that forms part of a bracket, wall, or other pipe supporting element. It will be noted that the circular opening in plate 6 has a somewhat larger dimension than the outer pipe dimension, the annular space between the opening periphery and the pipe being of the proper size to receive a pair of telescoping cylindrical members.

A first or inner cylindrical member 8 telescopes pipe 5 and is movable longitudinally along the pipe. One end of member 8 is provided with an upstanding annular flange 9 or its equivalent, the flange cooperating as a stop to properly position the member when the clamp is finally assembled.

The portion of member 8 away from flange 9 has at least two longitudinal slots 10 whereby the internal diameter of that portion of member 8 may be reduced upon the application of peripheral pressure to the member as will be described hereinafter. The end of member 8 may be rounded as shown at 11 to facilitate clamp assembly.

A second or outer cylindrical member 15 is adapted to telescope cylindrical member 8 and substantially fill the space between member 8 and plate 6, as shown in the drawings. One end of member 15 has an upstanding annular flange 16 or its equivalent, one side of flange 16 being adapted to bear against plate 6 around the circular opening. A plurality of longitudinal slots 17 are provided in member 15 in the portion thereof extending away from flange 16. These slots define a plurality of finger elements 18 that permit the end of member 15 to be expanded or spread in such a manner that plate 6 may be securely clamped between the expanded elements of the member and the side of flange 16.

The spreading or expansion of the elements 18 is achieved by the use of a cam arrangement provided by an inwardly tapered surface 19 on the interior of the finger elements. The internal diameter tapers to a dimension at the member end that corresponds generally to the outer pipe diameter, as best shown at 20 in Fig. 4.

The clamping members are assembled as best shown in Fig. 4 wherein outer cylindrical member 15 is disposed in proper position relative to pipe 5 and plate 6 with flange 16 in engagement with the plate. Inner cylindrical element 8 is longitudinally moved along pipe 5 so that its end first telescopes the untapered end of member 15. Member 8 is then driven by any suitable means to force the two members into a telescoping relationship wherein flange 9 of member 8 engages outer cylindrical member 15, as best shown in Fig. 3. As will be seen in that figure, a cam action occurs between the two members whereby the finger elements 18 are spread outwardly to effect clamping relationship between member 15 and plate 6. This cam action also exerts a peripheral pressure on member 8 whereby the internal diameter of that member is reduced to effect clamping relationship between the member and pipe 5. This arrangement effects the desired substantially rigid connection between pipe 5 and plate 6.

From the above description it is thought that the construction and advantages of this invention will be readily apparent to those skilled in the art. Various changes and modifications may be made without departing from the spirit or losing the advantages of the invention.

Having thus described the invention, what I claim as new and desire to secure by Letters Patent is:

1. A clamp for effecting a rigid connection between a pipe and a plate having an opening through which the pipe extends, said clamp comprising an inner cylindrical member adapted to telescope said pipe, said member having an upstanding portion to provide a stop and having longitudinal slots extending away from said stop, an outer cylindrical member adapted to telescope said inner member and engage said stop, said outer member having an upstanding portion to engage said plate, the portion of said member extending away from said upstanding portion passing through said plate opening, the end of said extending portion being tapered inwardly to provide a reduced inner diameter, said portion having a plurality of longitudinal slots therein whereby telescoping of said members effects clamping relationship between said plate and said pipe.

2. A clamp for effecting a rigid connection between a pipe and a plate having an opening through which the pipe extends, said clamp comprising inner and outer telescoping members surrounding said pipe and passing through the plate opening, said members having longitudinal slots therein extending inwardly from corresponding member ends, the inner surface of the outer member being tapered inwardly toward its end whereby cam action occurs when the members are telescoped to spread the end of the outer member and also exert peripheral pressure on the inner member whereby clamping relationship between said pipe and said plate is effected.

3. A clamp for effecting a rigid connection between a pipe and a plate having an opening through which the pipe extends, said clamp comprising inner and outer telescoping members surrounding said pipe and passing through the plate opening, the telescoping members comprising shoulder portions and finger portions, said finger portions being resiliently bendable transversely of the members, and cam surfaces on the outer faces of the outer finger portions.

4. A clamp for effecting a rigid connection between a pipe and a plate having an opening through which the pipe extends, said plate comprising inner and outer telescoping members surrounding said pipe and passing through the plate opening, the telescoping members comprising shoulder portions and finger portions, said finger portions being resiliently bendable transversely of the members, the inner faces of the outer fingers being tapered whereby cam action occurs when the members are telescoped to separate the fingers of the outer members and also to exert peripheral pressure on the inner fingers whereby clamping relationship between said pipe and said plate is effected.

CARL R. MOLINE.

REFERENCES CITED

The following references are of record in the file of this patent:

UNITED STATES PATENTS

| Number | Name | Date |
|---|---|---|
| 1,835,155 | Harbert | Dec. 8, 1931 |
| 1,920,598 | Schirmer | Aug. 1, 1933 |
| 2,375,728 | Cadwallader | May 8, 1945 |